(12) United States Patent
Ishimura

(10) Patent No.: US 6,801,694 B2
(45) Date of Patent: Oct. 5, 2004

(54) METHOD AND DEVICE FOR FACE ALIGNMENT

(75) Inventor: Kiyomitsu Ishimura, Tokyo (JP)

(73) Assignee: NEC Engineering Ltd., Tokyo (JP)

( * ) Notice: Subject to any disclaimer, the term of this patent is extended or adjusted under 35 U.S.C. 154(b) by 89 days.

(21) Appl. No.: 10/082,162

(22) Filed: Feb. 26, 2002

(65) Prior Publication Data
US 2002/0126982 A1 Sep. 12, 2002

(30) Foreign Application Priority Data
Mar. 8, 2001 (JP) ........................................ 2001-064199

(51) Int. Cl.⁷ ................................................ G02B 6/38
(52) U.S. Cl. .............................. 385/52; 385/28; 385/62; 385/70; 385/90
(58) Field of Search .............................. 385/38–52, 62, 385/70, 90

(56) References Cited

U.S. PATENT DOCUMENTS 3,593,961 A * 7/1971 Stewart ....................... 251/349
5,095,517 A * 3/1992 Monguzzi et al. ............ 385/90
5,347,605 A * 9/1994 Isaksson ....................... 385/92
5,937,123 A * 8/1999 Frelier ......................... 385/79

FOREIGN PATENT DOCUMENTS

JP 7-063961 3/1995
JP 8-281464 10/1996

* cited by examiner

Primary Examiner—Akm Enayet Ullah
Assistant Examiner—Jerry T Rahll
(74) Attorney, Agent, or Firm—Foley & Lardner LLP (57) ABSTRACT

A face alignment device of the present invention comprises two units that are each provided with: a convex semi-spherical block having a contact surface that makes contact with a clamp member for securing an object and a convex semi-spherical surface on the opposite side of the contact surface; and a base block having a concave portion corresponding to the semi-spherical surface of the convex semi-spherical block for rotatably holding the convex semi-spherical block, wherein the two units are arranged such that their contact surfaces face each other. The clamp member is attached to the contact surfaces of the respective units at eccentric positions from the center axes of the convex semi-spherical blocks. This is advantageous since a load required for rotational sliding between each of the semi-spherical surfaces of the convex semi-spherical blocks and each of the concave portions of the base blocks can be small.

12 Claims, 6 Drawing Sheets

METHOD AND DEVICE FOR FACE ALIGNMENT

FIELD OF THE INVENTION

The present invention relates to a device and a method for face alignment. More particularly, the present invention relates to a device and a method for face alignment used for adjusting faces and center axes of optical components upon bonding the optical components.

BACKGROUND OF THE INVENTION

Figure 6:
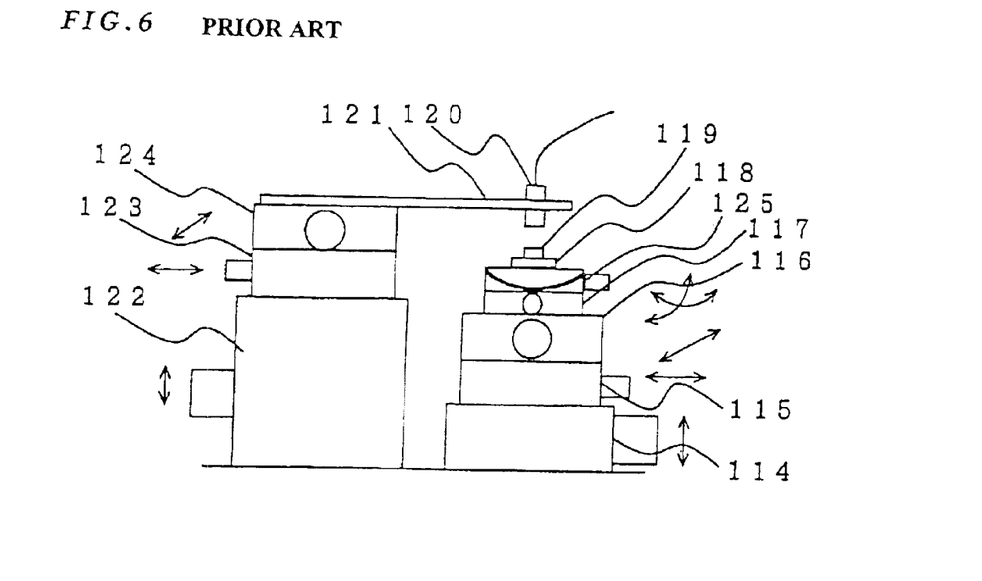
FIG. 6 is a plan view showing a conventionally-employed face tracing/center axis adjustment mechanism.

In order to adjust faces and center axes of optical components upon bonding them, a face tracing/center axes aligning mechanism as shown in FIG. 6 is conventionally employed.

This mechanism is provided with a stacked adjustment stage unit which is attached with a clamp member 121. The clamp member 121 clamps one object 120. The stage unit includes a height adjustment stage 122, a transversal adjustment stage 123 and a longitudinal adjustment stage 124. The mechanism is further provided with a height adjustment stage 114, a transversal adjustment stage 115, a longitudinal adjustment stage 116, a longitudinal flap stage 117, a transversal flap stage 125 and a clamp member 118 for clamping the other object 119.

In the above-described structure, the objects 119 and 120 are set and clamped by the clamp members 118 and 121, respectively. Here, the center axes of the objects 119 and 120 are matched by adjusting each of the stages as confirmed by the outer appearance or optical transfer characteristic of the objects.

Then, after the object 120 is lowered by the height adjustment stage 122 and the state of face contact between the objects 119 and 120 is confirmed, face alignment takes place. Specifically, after confirming face contact between the objects 119 and 120, the objects are once separated from each other to adjust the transversal flap stage 125 and the longitudinal flap stage 117 so as to find positions where the faces of the objects are parallel to each other. At this point, positions of the center axes of the objects 119 and 120 are once again confirmed. In most cases, the center axes are offset from each other at this point, and thus the above-described adjustment is repeated for several times to align the center axes and the faces of the objects 119 and 120.

Figure 7:
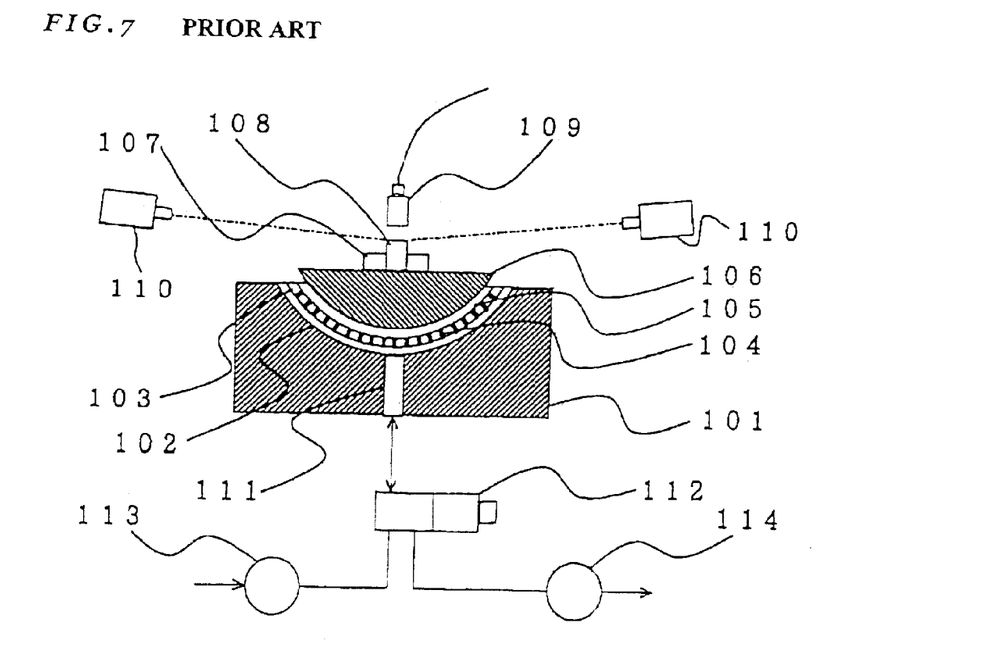
FIG. 7 is a cross-sectional view showing an example of a conventional face alignment device.

Another example of a conventional face alignment device is disclosed, for example, in Japanese Patent Laid-Open Application No. 8-281464, which is shown in FIG. 7.

This face alignment device is provided with a clamp member 107 for securing one object 108 on a seat 106 which has a convex spherical surface on one side. In this device, the other object 109 is lowered perpendicularly onto the object 108 so as to allow contact between the faces of the objects. Specifically, in order to allow contact between the faces of the objects, the seat 106 having the convex spherical surface is slidably accommodated in a seat support member 103 which has a concave spherical surface formed in a base block 101. An air compressor pump 113 sends air via a switch valve 112, an air guiding path 111, an air receiver 102 and air throughholes 104 that are formed through the seat support member 103, thereby forming an air layer 105.

The air layer 105 formed as described above will cause the seat 106 having the convex spherical surface to float, thereby eliminating sliding resistance between the seat 106 and the seat support member 103. Then, the object 109 is lowered perpendicularly onto the object 108 so that faces of both objects make contact with each other. At this point, the seat 106 having the convex spherical surface freely slides so that the face of the object 108 traces the tilt of the contacting face of the object 109.

Accordingly, the faces of the objects 108 and 109 can be aligned by applying pressure to each other. Thereafter, the injected air is evacuated by a vacuum pump 114 via the switch valve 112, whereby the seat 106 is suctioned and makes contact with the seat support member 103. Since no pressure applying mechanism such as the above-mentioned air compressor pump is placed near the contact faces of the objects on the seat 106, laser light sources 110 can be provided at any positions substantially horizontal to the objects, thereby enabling to weld the objects 108 and 109 together.

As a third conventional example, Japanese Patent Laid-Open Application No. 7-63961 discloses a method for assembling an optical semiconductor module. This method uses a jig having first and second blocks. The first block has an upper surface with a setting hole for holding a lens holder member having an optical semiconductor device, and a convex semi-spherical bottom surface. The second block has a concave semi-spherical surface corresponding to the convex semi-spherical surface of the first block so as to rotatably hold the first block. This jig secures an optical fiber and the lens holder member held in the setting hole of the first block while they are making contact. Thus, the center axes of the lens holder and the optical fiber can easily be adjusted upon assembly, while their faces are maintained to be parallel to each other, thereby enhancing optical accuracy.

However, in the face tracing/center axes adjusting mechanism according to the first conventional example, each object is adjusted by the mechanism of triaxial or pentaxial stages. As a result, the size of a control system becomes considerably large as compared to the size of the product, and a large area of the work area will be occupied by the device. In addition, since there are many axes involved that need to be controlled, operation of the device takes a long period of time, thereby deteriorating the working efficiency.

In the face alignment device and the method for assembling an optical semiconductor module according to the second and third conventional examples, respectively, the objects are placed on a flat surface opposite to the convex spherical surface, in the vicinity of the center axis of the convex spherical surface. Accordingly, external force is mostly applied downward, and thus force for letting the face of the object to trace the tilt of the other face (i.e., force for promoting rotation along the spherical surface) becomes small. Thus, in order to promote rotation of the spherical surface with the load applied to the center axis of the upper surface to let one face trace the other, a considerably large force is required, which may result in breaking or damaging the objects.

As another problem caused in the second and third conventional examples, objects are not placed at a position corresponding to the center of the spherical surface, which may result in offset of center axes of the objects from each other. If the objects are placed at a position corresponding to the center of the spherical surface, the faces can trace each other without changing the center axes of the objects and using the center axis as a base point. However, in the conventional examples, objects are not placed at a position corresponding to the center of the spherical surface and thus the center axes of the objects are offset from each other. As a result, the center axis needs to be readjusted after face tracing.

In more detail, as a general procedure, faces of the objects are allowed to make contact with each other such that there is no space between them, and then, the center axes of the objects are aligned. However, face tracing followed by alignment of the center axes of the objects needs to be carried out for several times while confirming the appearance or the optical transfer characteristic of the objects, thus requiring a long period of time.

In the face alignment device of the second conventional example, in order to eliminate sliding resistance between the seat support member and the seat clamping the object, the convex spherical surface of the seat is floated by forming a layer with air injected through the air throughholes in the concave spherical seat support member. The thickness of the air layer formed between the seat and the seat support member is several $\mu$m.

In the following step, face of one object is allowed to trace the face of the other object and the position is determined. Then, the air sent during the alignment and position determination is evacuated by the vacuum pump by switching the switch valve, whereby the convex spherical surface of the seat is suctioned and attached to the concave surface of the seat support member. Since this causes a gap between the objects and changes the load applied on the upper surface, a mechanism for following the change of the load is further required. In addition, the gap also causes change in the optical transfer characteristic.

SUMMARY OF THE INVENTION

In view of the above-described problems in conventional face alignment devices and the like, the present invention has an objective of providing a device and a method for face alignment that can be realized with high accuracy, a simple structure, a short period of time for adjustment, high productivity, and without causing breakage or damage of the objects.

In order to achieve the above-described objective, a face alignment device according to the present invention comprises two units that are each provided with: a convex semi-spherical block having a contact surface that makes contact with a clamp member for securing an object and a convex semi-spherical surface on the opposite side of the contact surface; and a base block having a concave portion corresponding to the semi-spherical surface of the convex semi-spherical block for rotatably holding the convex semi-spherical block. The two units are arranged such that their contact surfaces face each other.

According to the present invention, the convex semi-spherical blocks securing the objects are rotatably held in the concave portions of the respective base blocks. Accordingly, when a load is put on one object secured on the convex semi-spherical block via the other object to be bonded with, the objects are free to move so that face matching can be realized without causing a space between the objects. Since each unit has a simple structure of the convex semi-spherical block and the base block, they can be controlled easily.

A face alignment device according to the present invention further comprises an air layer forming means for forming an air layer between each of the semi-spherical surfaces of the convex semi-spherical blocks and each of the concave portions of the base blocks; and a moving means for moving the two base blocks to be close to or apart from each other.

According to the present invention, while the objects secured perpendicular to the convex semi-spherical blocks are subjected to face matching, face alignment and bonding, an air layer is formed between each of the convex semi-spherical blocks and each of the concave portions of the base blocks. When the air layers are evacuated thereafter such that the convex semi-spherical blocks make contact with the respective concave portions, the objects may move in the gap taking place of the air layers, which may cause a space between the objects. However, according to the present invention, the air layers are eliminated while the two base blocks (i.e., the concave portions) are translated toward each other. Thus, the objects can be bonded accurately without moving.

In a face alignment device according to the present invention, the clamp member is provided with a bearing so that it can rotatably hold the object.

According to the present invention, since the objects are rotatably held by the bearings, not only the faces of the objects (e.g., optical components) but the optical center axes of them can also be aligned. Thus, face alignment can take place with respect to the best position for optical transfer characteristics of the optical components.

Furthermore, in a face alignment device according to the present invention, the object is held outside the two units by the clamp member, while a weight is provided at the other end of the clamp member opposite to the object.

According to the present invention, the clamp members can hold the objects outside the two units. As a result, the objects are uncovered, which allows efficient operations such as adhesion application and laser irradiation. In addition, since a weight is provided at the other end of the clamp member opposite to the object, the convex semi-spherical blocks will not be displaced by the load put upon face matching and face alignment of the objects, thereby allowing operations in a stable manner.

In another aspect, the present invention is a face alignment method, comprising: arranging two units, which are each provided with a convex semi-spherical block having a contact surface that makes contact with a clamp member for securing an object and a convex semi-spherical surface on the opposite side of the contact surface, and a base block having a concave portion corresponding to the semi-spherical surface of the convex semi-spherical block for rotatably holding the convex semi-spherical block, such that the contact surfaces of the two units face each other; and securing one of the objects with the clamp member. The clamp member is arranged on the contact surfaces of the two units at eccentric positions from the center axes of the contact surfaces.

According to the present invention, the clamp member is held at an eccentric position from the center axes of the convex semi-spherical blocks. Accordingly, the load for allowing rotational sliding between each of the semi-spherical surfaces of the convex semi-spherical blocks and each of the concave portions of the base blocks can be small. For example, the load can be as small as several-tens of grams which has conventionally been from several-hundreds of grams to several kilograms, thereby preventing breakage and damage of the objects as well as rendering control of the load easy. No space is caused between the faces of the objects, which results in enhancement of performance and thus enhancement of productivity.

In a yet another aspect, the present invention is a face alignment method, comprising: arranging two units, which are each provided with a convex semi-spherical block having a contact surface that makes contact with a clamp member for securing an object and a convex semi-spherical surface on the opposite side of the contact surface, and a base block having a concave portion corresponding to the semi-spherical surface of the convex semi-spherical block for rotatably holding the convex semi-spherical block, such that the contact surfaces of the two units face each other; and securing one of the objects with the clamp member. The faces of the objects are aligned while the clamp member is arranged on the contact surfaces of the units such that the center point of the face of one of the objects corresponds to a center point of an imaginary sphere formed by the facing semi-spherical surfaces of the convex semi-spherical blocks.

According to the present invention, the faces of the objects are aligned while the center point of the face of one object is matched with the center point of the imaginary sphere. Therefore, face alignment can be performed easily without the center axes of the objects being offset from each other.

DETAILED DESCRIPTION OF THE INVENTION

Hereinafter, the present invention will be described in detail with reference to the drawings.

Figure 1:
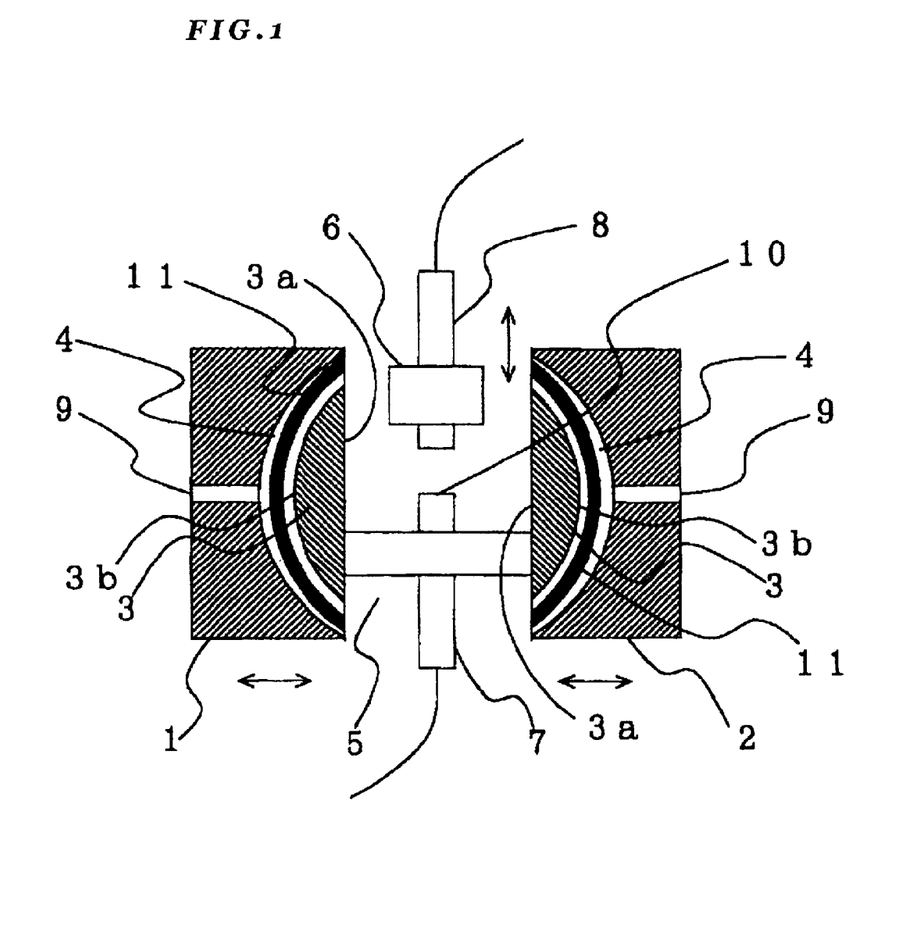
FIG. 1 is a plan view showing a first example of a face alignment device of the present invention.
Figure 2:
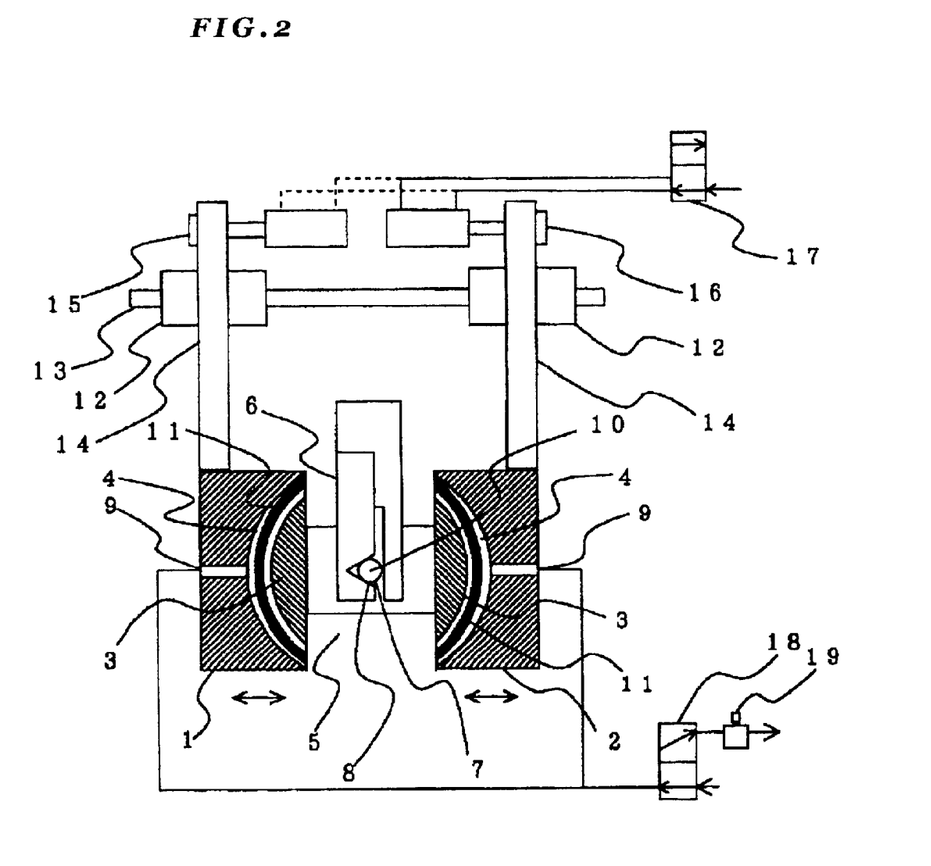
FIG. 2 is a top view showing the first example of the face alignment device of the present invention.

FIGS. 1 and 2 are schematic views showing a first example of a face alignment device according to the present invention. This face alignment device has a double-unit structure. Each unit is provided with: a convex semi-spherical block 3 having a contact surface 3a that makes contact with a clamp member 5 for securing an object 7 and a semi-spherical surface 3b on the opposite side of the contact surface 3a; and a base block 1 (2) having a porous concave spherical surface (concave portion) that accommodates the semi-spherical surface 3b of the convex semi-spherical block 3 for rotatably holding the convex semi-spherical block 3. The units are arranged such that their contact surfaces 3a face each other.

The clamp member 5 is arranged such that it is sandwiched between the contact surfaces 3a of the convex semi-spherical blocks 3 of the respective units, thereby clamping the object 7.

In order to eliminate sliding resistance between the semi-spherical surfaces 3b of the convex semi-spherical blocks 3 and the porous concave spherical surfaces 4, air is injected through the porous concave spherical surfaces 4 to form air layers 11 of several μm, thereby allowing the convex semi-spherical blocks 3 to float.

A switch valve 18 either supplies or evacuate air through the porous concave spherical surface 4, i.e., switches the direction of the flow of air through the porous concave surface 4.

The base blocks 1 and 2 are secured to table supports 14. Tables 12 secured to the table supports 14 are slidably attached to a guide 13.

Air cylinders 15 and 16 are provided at the ends of the table supports 14 so as to translate the base blocks 1 and 2 close to or apart from each other via the table supports 14.

Hereinafter, operations of the face alignment device having the above-described structure will be described in detail.

After clamping the object 7 with the clamp member 5, highly pressurized air is sent by the switch valve 18 to be injected through the porous concave spherical surfaces 4 via air guiding paths 9 to form air layers 11 having a thickness of several μm. As a result, the convex semi-spherical blocks 3 are allowed to float and thus the clamp member 5 secured to the convex semi-spherical blocks 3 becomes free.

Next, an object 8 clamped by a clamp member 6 is lowered to make contact with the object 7. Since the clamp member 5 is sandwiched offset from the center axes of the convex semi-spherical blocks 3, the object 8 clamped by the clamp member 6, for example, allows the convex semi-spherical blocks 3 to slide along the porous concave spherical surfaces 4 with a load of as small as several-tens of grams, thereby applying a moment to the convex semi-spherical blocks 3 in the rotational direction.

Offset of the center axes of the objects upon face alignment can be prevented by aligning the center point of the object 7 with a center point of an imaginary sphere. Specifically, the center point of the object 7 is aligned with the center point 10 of the imaginary sphere formed by the two convex semi-spherical blocks 3 so that the aligned faces are forced to move with the load applied with respect to the center point 10. As a result, the faces of the objects 7 and 8 can be aligned without their center axis being offset.

Once the faces of the objects 7 and 8 are aligned and bonded, the switch valve 18 is switched to exhaust air forming the air layers 11 by a regulator 21 while controlling the exhausted air volume. At the same time, the base blocks 1 and 2 are moved toward each other by the air cylinders 15 and 16 to maintain the face alignment between the objects 7 and 8.

Figure 3:
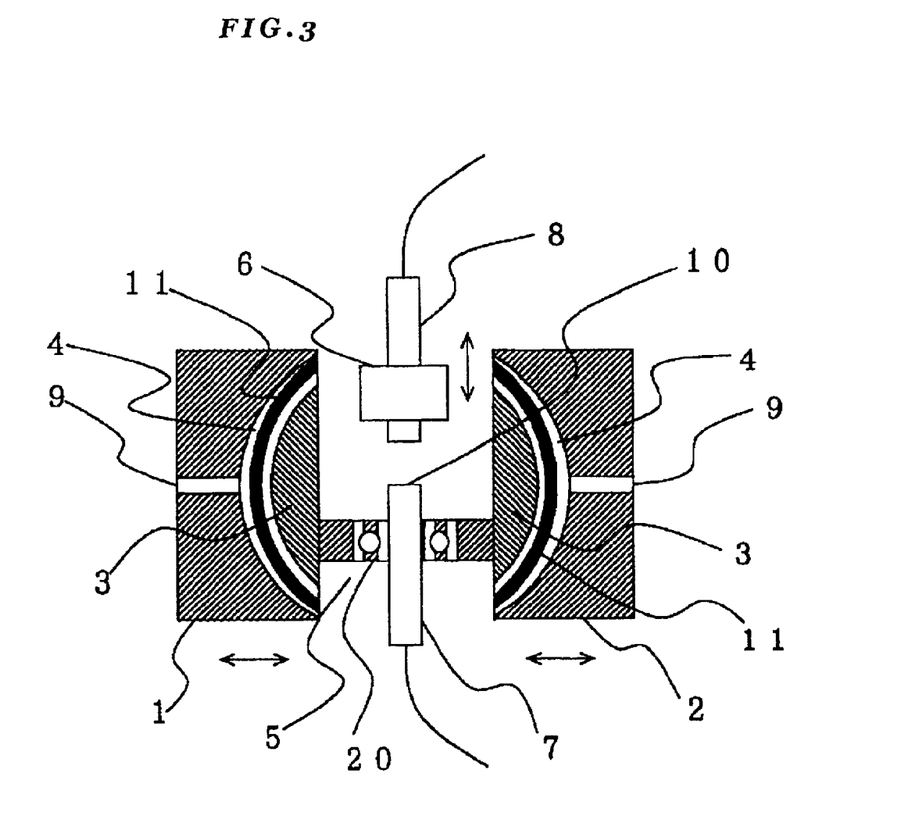
FIG. 3 is a plan view showing a second example of a face alignment device of the present invention.

Hereinafter, a second example of a face alignment device according to the present invention will be described with reference to FIG. 3.

The structure of the present example is the same as that of the first example except that the clamp member 5 is provided with bearings 20 for clamping the object 7.

Next, operations of the face alignment device of the second example will be described. After clamping the object 7, highly pressurized air is sent by a switch valve (not shown) to be injected through porous concave spherical surfaces 4 via air guiding paths 9 to form air layers 11, thereby applying a force that makes the convex semi-spherical blocks 3 float. As a result, the clamp member 5 secured to the convex semi-spherical blocks 3 becomes free, thereby enabling face alignment between the objects 7 and 8.

Next, an object 8 clamped by a clamp member 6 is lowered to make contact with the object 7. Since the clamp member 5 is attached to the convex semi-spherical blocks 3 offset from the center axes thereof, the object 8 clamped by the clamp member 6, upon making contact with the object 7, can apply a moment to the convex semi-spherical blocks 3 in the rotational direction with a small load. Accordingly, face alignment of the objects 7 and 8 requires a pressure load of as small as several-tens of grams. So far, the operation is the same as that of the first example.

Next, the feature of the present example will be described. According to face alignment and face tracing mechanisms for optical components and the like, not only the faces of the components need to be aligned or traced to each other with respect to the light traveling direction but the optical center axis may be eccentric, in which case the bearings 20 allow the object 7 to rotate with respect to the optical center axis so that face alignment can take place while finding the best position for optical transfer. The operation following the face alignment and face tracing, i.e., securing the alignment position, is the same as that in the first example.

Figure 4:
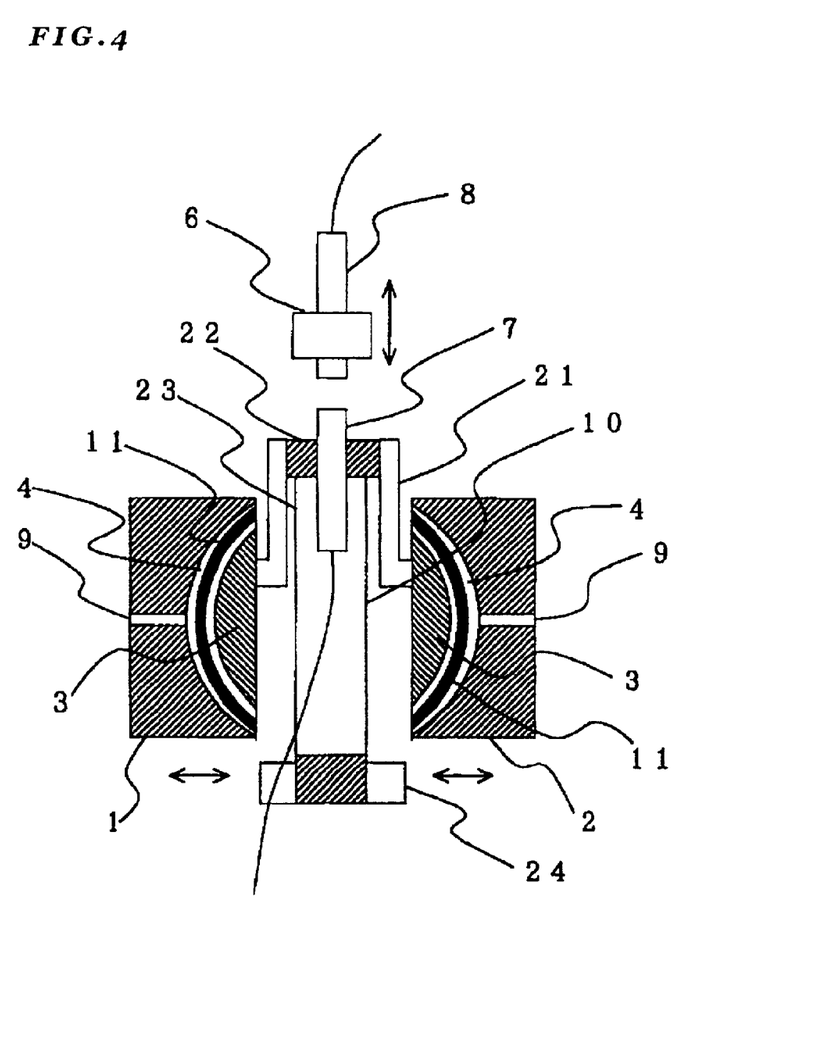
FIG. 4 is a plan view showing a, third example of a face alignment device of the present invention.
Figure 5:
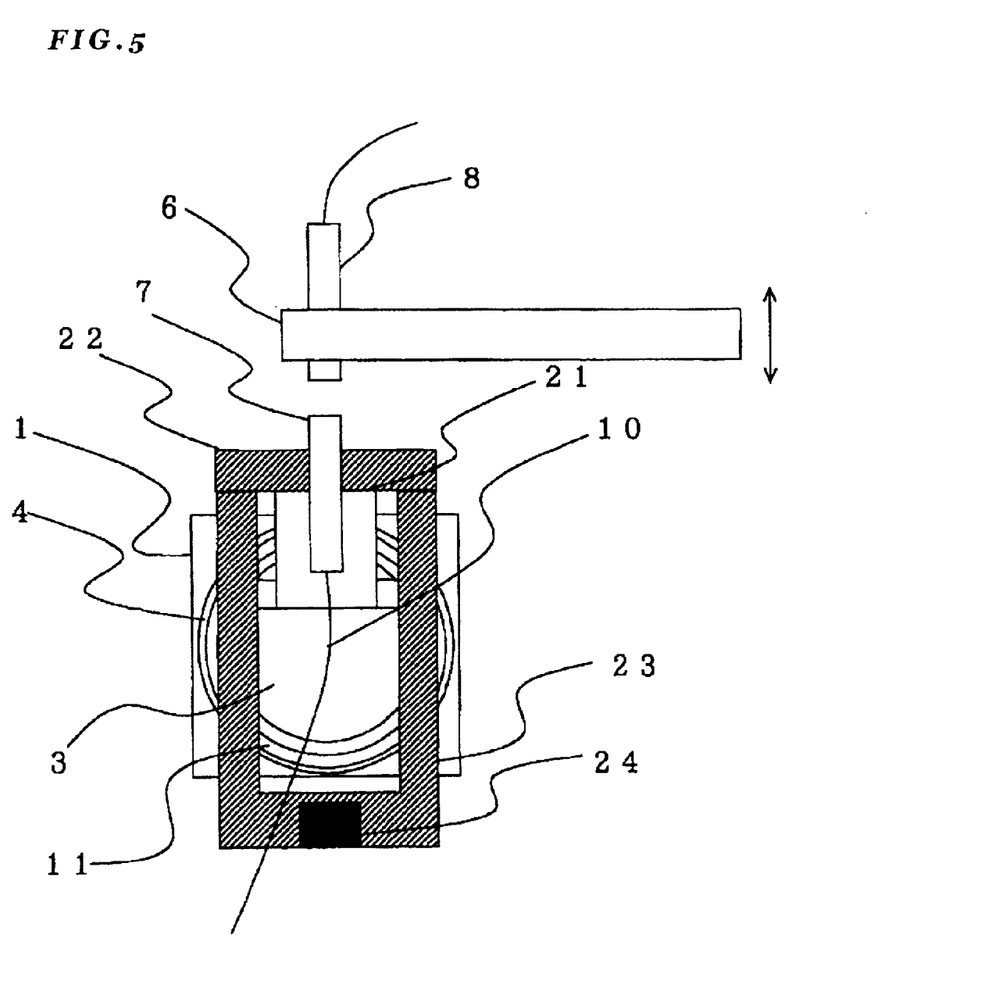
FIG. 5 is a side view showing the third example of the face alignment device of the present invention.

Hereinafter, a third example of a face alignment device according to the present invention will be described with reference to FIGS. 4 and 5.

The aim of the present example is to improve the operation efficiency by increasing options for securing the aligned faces (e.g., adhesive, welding, etc.) by a face alignment/center axes adjustment operation outside the above-described two units.

According to the present example, a clamp base 21 is attached above the convex semi-spherical blocks 3 to enable face alignment and face tracing with a small load as described above. The clamp base 21 is provided with a clamp member 22 for clamping an object 7 to be aligned outside the two units. The clamp member 22 is attached with a weight support 23 for supporting a weight 24 for balancing the convex semi-spherical blocks 3 while they are floating on the air. The weight 24 and the weight support 23 allow face alignment and face matching without the convex semi-spherical blocks 3 being fluctuated by the load applied upon face matching or face alignment of the objects 7 and 8. Since the objects 7 and 8 are uncovered, operations such as application of adhesion or laser irradiation can be carried out efficiently.

In the above-described examples, the air layers 11 are formed between the semi-spherical surfaces 3b of the convex semi-spherical blocks 3 and the porous concave spherical surfaces 4 to eliminate sliding resistance therebetween. However, other means such as oil bearing or the like may also be used in replacement as long as the frictional resistance between the semi-spherical surfaces 3b of the convex semi-spherical blocks 3 and the concave portions that accommodate the semi-spherical surfaces 3b are sufficiently smooth.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-64199 (Filed on Mar. 8$^{th}$, 2001) including specification, claims, drawings and summary are incorporated herein by reference in its entirety.

What is claimed is:

1. A face alignment device comprising:
    a first convex semi-spherical block having a first contact surface and a first convex semi-spherical surface on the opposite side of the first contact surface;
    a second convex semi-spherical block having a second contact surface and a second convex semi-spherical surface on the opposite side of the second contact surface;
    a first base block having a first concave portion corresponding to the first convex semi-spherical surface of the first convex semi-spherical block for rotatably holding the first convex semi-spherical block;
    a second base block having a second concave portion corresponding to the second convex semi-spherical surface of the second convex semi-spherical block for rotatably holding the second convex semi-spherical block;
    a clamping element making contact with the first contact surface and the second contact surface at an eccentric position from the center axes of the first and second convex semi-spherical blocks for securing an object; and
    an air layer forming means for forming an air layer between the first convex semi-spherical surface of the first convex semi-spherical block and the first concave portion of the first base block and between the second convex semi-spherical surface of the second convex semi-spherical block and the second concave portion of the second base block;
    wherein the first convex semi-spherical block and the second convex semi-spherical block are arranged such that the first contact surface faces the second contact surface.

2. A face alignment device according to claim 1 further comprising a moving means for moving the first base block and the second base block to be close to or apart from each other.

3. A face alignment device according to claim 2,
    wherein the object is held outside an area between the first convex semi-spherical block and the second convex semi-spherical block by the clamping element,
    wherein a face that is to be aligned of the object extends out of the clamping element, and
    wherein a weight is provided at the other end of the clamping element opposite to the object.

4. A face alignment device according to claim 1, wherein the clamping element is provided with a bearing so that it can rotatably hold the object.

5. A face alignment device according to claim 1,
    wherein the object is held outside an area between the first convex semi-spherical block and the second convex semi-spherical block by the clamping element,
    wherein a face that is to be aligned of the object extends out of the clamping element, and
    wherein a weight is provided at the other end of the clamping element opposite to the object.

6. A face alignment device according to claim 1, wherein the clamping element comprises a clamp member and a clamp base.

7. A face alignment device comprising:
    a) two units that are each provided with;
        i) convex semi-spherical block having a contact surface that makes contact with a clamping element for securing an object and a convex semi-spherical surface on the opposite side of the contact surface; and
        ii) a base block having a concave portion corresponding to the semi-spherical surface of the convex semi-spherical block for rotatably holding the convex semi-spherical block; and
    b) an air layer forming means for forming an air layer between each of the semi-spherical surfaces of the convex semi-spherical blocks and each of the concave portions of the base blocks; and c) a moving means for moving the two base blocks to be close to or apart from each other, wherein the two units are arranged such that their contact surfaces face each other, and wherein the clamping element is provided with a bearing so that it can rotatably hold the object.

8. A face alignment device according to claim 7, wherein the object is held outside the two units by the clamping element, while a weight is provided at the other end of the clamping element opposite to the object.

9. A face alignment method, comprising:

arranging two units, which are each provided with a convex semi-spherical block having a contact surface that makes contact with a clamping element for securing an object and a convex semi-spherical surface on the opposite side of the contact surface, and a base block having a concave portion corresponding to the semi-spherical surface of the convex semi-spherical block for rotatably holding the convex semi-spherical block, such that the contact surfaces of the two units face each other; and securing the object with the clamping element, wherein the clamping element makes contact with the contact surfaces of the two units at an eccentric position from the center axes of the convex semi-spherical blocks of the two units.

10. A face alignment method, comprising:

arranging two units, which are each provided with a convex semi-spherical block having a contact surface that makes contact with a first clamping element for securing first object and a convex semi-spherical surface on the opposite side of the contact surface, and a base block having a concave portion corresponding to the semi-spherical surface of the convex semi-spherical block for rotatably holding the convex semi-spherical block, such that the contact surfaces of the two units face each other; and securing a second object with a second clamping element that does not make contact with the contact surfaces of the convex semi-spherical blocks of the two units, wherein the faces of the objects are aligned while the first clamping element makes contact with the contact surfaces of the units such that the center point of the face of the first object corresponds to a center point of an imaginary sphere formed by the facing semi-spherical surfaces of the convex semi-spherical blocks.

11. A face alignment device comprising two units that are each provided with:

a convex semi-spherical block having a contact surface that makes contact with a clamping element for securing an object and a convex semi-spherical surface on the opposite side of the contact surface; and a base block having a concave portion corresponding to the semi-spherical surface of the convex semi-spherical block for rotatably holding the convex semi-spherical block, wherein the two units are arranged such that their contact surfaces face each other, and wherein the clamping element is provided with a bearing so that it can rotatably hold the object.

12. A face alignment device according to claim 11, wherein the object is held outside the two units by the clamping element, while a weight is provided at the other end of the clamping element opposite to the object.

* * * * *